Patented Sept. 1, 1931

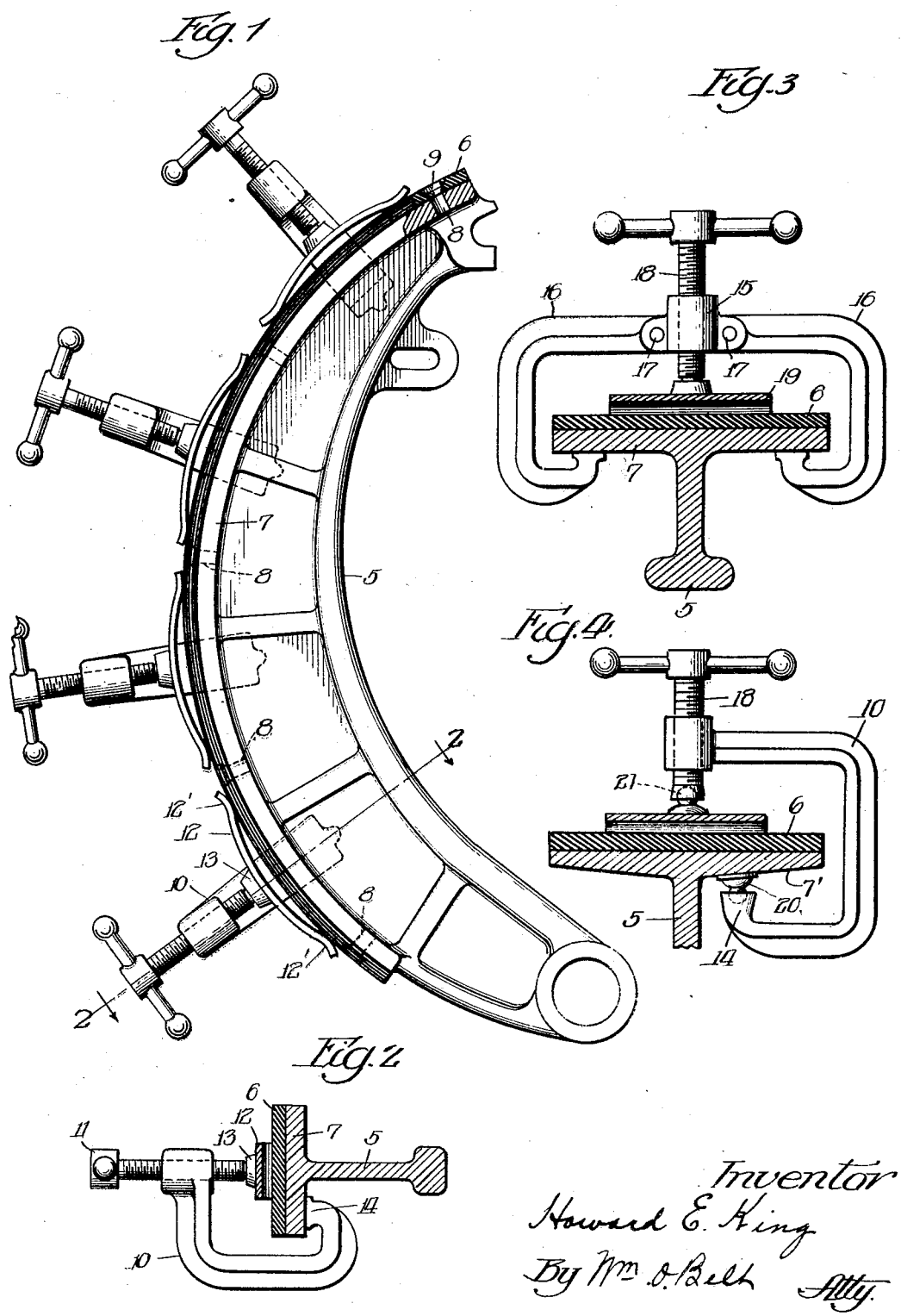

1,821,163

UNITED STATES PATENT OFFICE

HOWARD E. KING, OF BUFFALO, NEW YORK, ASSIGNOR TO AMERICAN BRAKE MATERIALS CORPORATION, OF NEW YORK, N. Y., A CORPORATION OF NEW YORK

CLAMP

Application filed November 20, 1929. Serial No. 408,647.

This invention relates to clamps for use in applying friction linings to shoes, heads or other supports in friction brake assemblies and it has for its object to provide a clamp of simple construction which can be easily applied for holding the lining in close and continuous contact with the support so as to enable the lining to be fastened to the support smoothly, evenly and in snug contact therewith throughout its length.

A further object of the invention is to hold the lining tightly against its support while the rivet holes are being drilled and countersunk in the lining and the rivets are being secured in place to avoid the presence of air pockets under the lining and to preserve a predetermined clearance between the support and the drum of an internal expanding brake.

In the accompanying drawings illustrating a selected embodiment of the invention, Fig. 1 is an elevation partly in section showing the invention in use in applying a continuous lining upon the support in the form of a shoe of an internal friction brake.

Fig. 2 is a transverse sectional view on the line 2—2 of Fig. 1.

Fig. 3 is an enlarged transverse sectional view showing another form of the invention.

Fig. 4 is a sectional view showing another form.

Referring to the drawings 5 is a shoe, sometimes called a head, of an internal expanding brake and constituting the support for a friction lining 6 which is usually riveted on the face plate 7 of the shoe. I have selected this type of support to illustrate the invention and I wish to have it understood that the invention may be used with other supports and with any kind of lining or liner for which the invention may be adapted. Some linings are woven and others are molded and my invention is adapted for both kinds since it does not involve stretching the lining but produces a snug and continuous contact of the entire contacting surface of the lining with the face plate of the shoe.

The face plate is bored at 8 and the lining 6 is bored at 9 to register with the bores 8 to receive rivets, not shown, whereby the lining is fastened to the face plate. A plurality of clamps are employed to hold the lining flatly and snugly throughout its length and width against the face plate while the rivet openings 9 are being bored and while the rivets are being applied. The single type of clamp is shown in Figs. 1 and 2 and comprises a C beam with the lower arm shorter than the upper arm so that the latter may extend over the mid line of the face plate 7 of the shoe while the shorter arm having a jaw may engage nearer the edge of the face plate to avoid contact with the shoe flange, the jaw member 10 and a screw member 11 operating through the jaw member. A pressure member is arranged on or at the inner end of the screw member to be pressed thereby upon the lining and it comprises an elongated bowed spring plate 12 having a socket 13 midway between its ends to receive the end of the screw member. This socket may be on open recess and the spring may be separated from the screw, or it may be a swiveled socket with the spring swiveled to the shoe. The spring plate extends longitudinally of the lining and transversely to the C-clamp and is of sufficient length and width to press the lining thereunder tightly against the face plate throughout the length and width of the lining, and for this purpose it is convenient to make the spring about as long as the standard distance between rivet openings 8 in the face plate.

In practice the jaw 14 of the clamp is engaged with the under side of the face plate and the spring plate and the pressure plate 12 is applied lengthwise to the lining between two adjacent rivet openings 18 in the face plate. Then the screw 11 is adjusted to secure the clamp tightly in place with the pressure plate bearing upon the lining and holding the lining snugly, evenly and tightly in contact throughout its length and width in the area on which the pressure plate operates against the face plate. The end portions 12' of the pressure plate yieldingly project below the middle portion of the plate and are curved up to slide easily on the lining whether it be woven fabric, molded or other material. I prefer to apply a plurality of clamps sufficient to secure the lining throughout its length upon the face plate, as shown in Fig. 1, after which the openings 9 are bored and countersunk and the rivets are applied for fastening the lining on the face plate.

My invention is especially adapted for internal expanding brakes wherein a shoe is faced with friction material and is forced against the rim of the drum to brake the wheel. Any expansion of the drum due to heat and any distortion of the drum due to heat and brake pressure increases the clearance between the lining and the rim of the drum so that the shoe must move farther to operatively engage the drum, and this requires further movement of the operating parts which are limited in movement by the throw available on the foot pedal or hand lever. As a result the specifications for friction brakes on automotive vehicles now require a very small clearance between the lining and the rim of the drum to insure efficient brakes. This makes it necessary to observe more care than formerly in facing a shoe to make the facing lie snugly, evenly and tightly against the face plate of the shoe. If the lining is not applied snugly, evenly and tightly, it is liable to have ridges or protuberances on its outer face and to have air pockets between itself and the face plate. This causes the brake to drag and produces other injurious effects. My invention overcomes these difficulties by providing means for holding the lining snugly throughout its contact surface against the face plate of the shoe without stretching the lining or otherwise distorting it so that when the lining is fastened to the shoe it will lie smoothly and evenly on the shoe under all conditions. I prefer to use as many clamps as may be required for mounting the lining on the shoe and then to drill the holes and apply the rivets, but one or two clamps may be used at a time if desired. The single type clamp of Figs. 1 and 2 is easy to handle and entirely satisfactory but a double type clamp, Fig. 3, may be used, if desired, especially for wide face plates. In this clamp the jaw member 15 has two oppositely disposed jaws 16 pivoted thereto at 17 and the screw member 18 operates through the jaw member 15 and carries a yielding pressure plate 19.

Sometimes the back of the face plate is inclined as at 7', Fig. 4, and I may provide the jaw of the clamp with a swivel bearing 20 so that it will make flat contact therewith. The pressure member may also be swivelled to the screw member as at 21, Fig. 4, if desired.

My invention provides a universal clamp for use in mounting friction facings of all kinds on shoes, heads or other supports and while it is particularly useful in connection with molded linings it can also be used with woven linings with equally good results. In Fig. 1 I have shown four clamps holding a molded lining in place on a shoe but the work can be accomplished by using one clamp and advancing it endwise of the lining as the rivets are applied.

I have shown the invention in simple forms which are suitable for the purpose intended but I reserve the right to make all such changes therein as may be found necessary or desirable to satisfy different conditions and within the scope of the following claims.

I claim:

1. A C-clamp having a jaw at one end thereof and a bearing portion at the other end thereof offset from alignment with the jaw, a screw operating through the bearing portion movable toward, away from or past the jaw, and a yieldable pressure member at the inner end of said screw adapted to cooperate with said jaw and lying transversely of the plane of the C beam and having yielding downward projecting arms with upturned ends to press and hold longitudinally stretched the brake band.

2. A C-clamp having a jaw at one end thereof and a bearing portion at the other end thereof offset from alignment with the jaw, a screw operating through the bearing portion movable toward, away from or past the jaw, and an elongated pressure plate curved longitudinally thereof and disposed at the inner end of said screw member, said pressure plate cooperating with said jaw and lying transversely of the plane of the C beam and having yielding downwardly projecting arms with upturned ends to press and hold longitudinally stretched the brake band.

HOWARD E. KING.